US008240631B2

(12) United States Patent
Schrock et al.

(10) Patent No.: US 8,240,631 B2
(45) Date of Patent: Aug. 14, 2012

(54) APPARATUS FOR CONTROLLING LIQUID IN A CUP HOLDER

(75) Inventors: Kevin Schrock, Sarasota, FL (US); Elliott J. Onstine, Bradenton, FL (US); Michael J. Rodney, Sr., Venice, FL (US); Zachary Zahrndt, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 373 days.

(21) Appl. No.: 12/478,064

(22) Filed: Jun. 4, 2009

(65) Prior Publication Data

US 2010/0308092 A1 Dec. 9, 2010

(51) Int. Cl.
*A47B 91/00* (2006.01)
*A47G 29/00* (2006.01)
*B65D 19/00* (2006.01)

(52) U.S. Cl. ............... 248/346.11; 248/346.03; 215/393
(58) Field of Classification Search .............. 248/309.1, 248/311.2, 312.1, 314, 346.11, 346.03; 361/679.01, 361/679.02, 679.3, 679.26, 679.23; 379/455, 379/446
See application file for complete search history.

(56) References Cited

U.S. PATENT DOCUMENTS

| | | | | |
|---|---|---|---|---|
| 2,496,157 A | * | 1/1950 | Gaudino | 248/346.11 |
| 2,641,911 A | * | 6/1953 | Raymond et al. | 248/346.11 |
| 3,268,198 A | * | 8/1966 | Swett | 248/346.11 |
| 3,805,991 A | * | 4/1974 | Cheladze et al. | 220/373 |
| 3,808,084 A | * | 4/1974 | Doty | 248/346.11 |
| 4,040,549 A | * | 8/1977 | Sadler | 224/483 |
| 4,305,533 A | * | 12/1981 | Wightman et al. | 224/540 |
| 4,974,741 A | * | 12/1990 | Gustafson et al. | 220/739 |
| 5,273,182 A | * | 12/1993 | Laybourne | 220/740 |
| 5,326,064 A | * | 7/1994 | Sapien | 248/311.2 |
| 5,590,861 A | | 1/1997 | Ardolino | |
| 5,644,471 A | | 7/1997 | Schultz et al. | |
| 5,669,538 A | * | 9/1997 | Ward | 224/539 |
| 5,848,722 A | | 12/1998 | Hanes | |

(Continued)

FOREIGN PATENT DOCUMENTS

EP 1726918 11/2006

OTHER PUBLICATIONS

Mead, "Docking Station for Portable Electronic Devices", "U.S. Appl. No. 12/403,088", filed Mar. 12, 2009.

(Continued)

*Primary Examiner* — Nkeisha Smith
(74) *Attorney, Agent, or Firm* — Ingrassia Fisher & Lorenz, P.C.

(57) ABSTRACT

An apparatus for controlling liquid in a cup holder is provided. The apparatus includes a cup holder having a bottom, wherein the bottom has at least one aperture and a plurality of grooves. An electrical connector is located within the at least one aperture. The apparatus also includes a removable coaster configured to be placed within the cup holder and cover the electrical connector. The removable coaster has a plurality of ridges extending therefrom. The plurality of ridges is configured to extend into the plurality of grooves in the bottom of the cup holder. A surface is positioned below the aperture. The surface has at least one weep hole and at least one wall between the surface and the electrical connector. Finally, the apparatus comprises a drip line in the path of liquid flow from the at least one weep hole.

18 Claims, 4 Drawing Sheets

U.S. PATENT DOCUMENTS

| | | | |
|---|---|---|---|
| 5,897,041 A * | 4/1999 | Ney et al. ................ 224/483 |
| 6,042,414 A | 3/2000 | Kunert | |
| 6,053,759 A | 4/2000 | Kunert | |
| 6,062,518 A * | 5/2000 | Etue ..................... 248/231.21 |
| 6,089,519 A * | 7/2000 | Laybourne ............ 248/346.11 |
| 6,189,755 B1 | 2/2001 | Wakefield | |
| 6,246,766 B1 | 6/2001 | Walsh | |
| 6,253,982 B1 | 7/2001 | Gerardi | |
| 6,264,153 B1 | 7/2001 | Ragner et al. | |
| 6,267,340 B1 * | 7/2001 | Wang ..................... 248/231.21 |
| 6,480,378 B2 | 11/2002 | Chang | |
| 6,539,358 B1 | 3/2003 | Coon et al. | |
| 6,591,085 B1 | 7/2003 | Grady | |
| 6,633,482 B2 | 10/2003 | Rode | |
| 6,641,102 B2 | 11/2003 | Veltri et al. | |
| 6,778,813 B1 | 8/2004 | Lilly | |
| 6,788,528 B2 | 9/2004 | Enners et al. | |
| D513,938 S | 1/2006 | Griffin | |
| 7,036,700 B2 * | 5/2006 | Engel et al. ................ 224/501 |
| 7,047,039 B2 | 5/2006 | Lalley | |
| 7,081,109 B2 | 7/2006 | Tighe et al. | |
| 7,099,466 B2 | 8/2006 | Walsh | |
| 7,099,467 B1 | 8/2006 | Rohrbach | |
| 7,140,586 B2 | 11/2006 | Seil et al. | |
| 7,200,357 B2 | 4/2007 | Janik et al. | |
| 7,236,863 B2 | 6/2007 | LaPorte et al. | |
| 7,269,002 B1 | 9/2007 | Turner et al. | |
| 7,280,802 B2 | 10/2007 | Grady | |
| 7,292,881 B2 | 11/2007 | Seil et al. | |
| 7,413,155 B2 | 8/2008 | Seil et al. | |
| 7,505,583 B2 * | 3/2009 | Rohrbach ................. 379/455 |
| 7,597,301 B2 * | 10/2009 | Seil et al. ................ 248/311.2 |
| 7,635,110 B2 * | 12/2009 | Galasso et al. ............ 248/200 |
| 7,643,283 B2 * | 1/2010 | Jubelirer et al. ......... 361/679.41 |
| 7,738,247 B2 * | 6/2010 | Choi ...................... 361/679.43 |
| 7,770,748 B2 * | 8/2010 | Elliott ..................... 220/212 |
| 7,782,012 B2 * | 8/2010 | Jo .......................... 320/115 |
| 7,850,484 B2 * | 12/2010 | Hayashi et al. ........... 439/529 |
| 7,868,585 B2 * | 1/2011 | Sarnowsky et al. .......... 320/108 |
| 2001/0045774 A1 | 11/2001 | Rode | |
| 2002/0134903 A1 * | 9/2002 | Lin ...................... 248/346.11 |
| 2004/0086112 A1 * | 5/2004 | Hilger et al. ............... 379/455 |
| 2004/0228622 A1 | 11/2004 | Schedivy | |
| 2005/0014536 A1 | 1/2005 | Grady | |
| 2006/0105819 A1 | 5/2006 | Liao | |
| 2006/0107295 A1 | 5/2006 | Margis et al. | |
| 2006/0134959 A1 | 6/2006 | Ellenbogen | |
| 2006/0181840 A1 * | 8/2006 | Cvetko .................... 361/679 |
| 2006/0238971 A1 | 10/2006 | Compton | |
| 2006/0243772 A1 | 11/2006 | Sirichai et al. | |
| 2007/0038434 A1 | 2/2007 | Cvetko | |
| 2007/0087725 A1 | 4/2007 | Anderson | |
| 2007/0114974 A1 | 5/2007 | Grady | |
| 2007/0155440 A1 | 7/2007 | Everett et al. | |
| 2007/0262600 A1 | 11/2007 | Chen | |
| 2007/0281619 A1 * | 12/2007 | Chen ........................ 455/42 |
| 2008/0019082 A1 | 1/2008 | Krieger et al. | |
| 2008/0033610 A1 | 2/2008 | Engel | |
| 2008/0079388 A1 * | 4/2008 | Sarnowsky et al. ......... 320/103 |
| 2008/0087786 A1 * | 4/2008 | Oas ........................ 248/311.2 |
| 2008/0130912 A1 | 6/2008 | Marlowe | |
| 2008/0138028 A1 | 6/2008 | Grady et al. | |
| 2008/0140240 A1 | 6/2008 | White et al. | |
| 2009/0073642 A1 * | 3/2009 | Jubelirer et al. ......... 361/679.01 |

OTHER PUBLICATIONS

"MacAlly Black iPod Cup Holder Docking Station", "http://www.Amazon.com", accessed Sep. 17, 2008, Publisher: MacAlly, pp. 1-4.

Rosenberg, Barry, "Inflight Entertainment", "http://www.aviationtoday.com", Aug. 1, 2008, Publisher: Avionics Magazine, pp. 1-4.

"niceTM Successfully Launched on Bombardier Challenger 200 Jet", "http://www.lufthansa-technik.com", Sep. 26, 2007, Publisher: Lufthansa Technik AG, pp. 1-2.

European Patent Office, "European Search Report", Aug. 23, 2010, Published in: EP.

* cited by examiner

APPARATUS FOR CONTROLLING LIQUID IN A CUP HOLDER

CROSS-REFERENCE TO RELATED APPLICATIONS

This application is related to the following co-pending United States patent application which is hereby incorporated herein by reference:

U.S. patent application Ser. No. 12/403,088 entitled "Docking Station for Portable Electronic Devices" and filed on Mar. 12, 2009.

BACKGROUND

Portable electronic devices are pervasive in our society today. Often these portable electronic devices can be coupled to electronic systems within a vehicle. For example, portable electronic devices containing music are often coupled to an in-vehicle stereo or entertainment system. To ease connection and disconnection of the portable electronic devices with the in-vehicle electronic systems, docking stations are used. Docking stations provide a port for electrical coupling to the portable electronic device and a connection to the in-vehicle electronic system. Docking stations also typically provide physical support to hold the portable electronic device in a station position. One type of docking station utilizes a cup holder in a vehicle for holding of the docking station. This type of docking station is placed into the cup holder and the portable electronic device is then placed into the docking station while the docking station is in the cup holder. Examples of docking stations suitable for use in a cup holder and other docking stations are described in co-pending U.S. patent application Ser. No. 12/403,088 which is hereby incorporated herein by reference.

SUMMARY

In one embodiment, an apparatus for controlling liquid in a cup holder is disclosed. The apparatus includes a cup holder having a bottom, wherein the bottom has at least one aperture and a plurality of grooves. An electrical connector is located within the at least one aperture. The apparatus also includes a removable coaster configured to be placed within the cup holder and cover the electrical connector. The removable coaster has a plurality of ridges extending therefrom. The plurality of ridges is configured to extend into the plurality of grooves in the bottom of the cup holder. A surface is positioned below the aperture. The surface has at least one weep hole and at least one wall between the surface and the electrical connector. Finally, the apparatus comprises a drip line in the path of liquid flow from the at least one weep hole.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments of the present invention.

DETAILED DESCRIPTION

The present disclosure is directed towards an apparatus for controlling liquid in a cup holder. The cup holder is located in a vehicle and comprises an electrical port for coupling a portable electronic device to an electronic system in the vehicle. The cup holder is configured to control liquid located therein to protect the electronic port and associated cables from liquid intrusion. For example, condensation from a cup placed in the cup holder is safely controlled such that the condensation does not intrude into the electronic port.

Figure 1A:
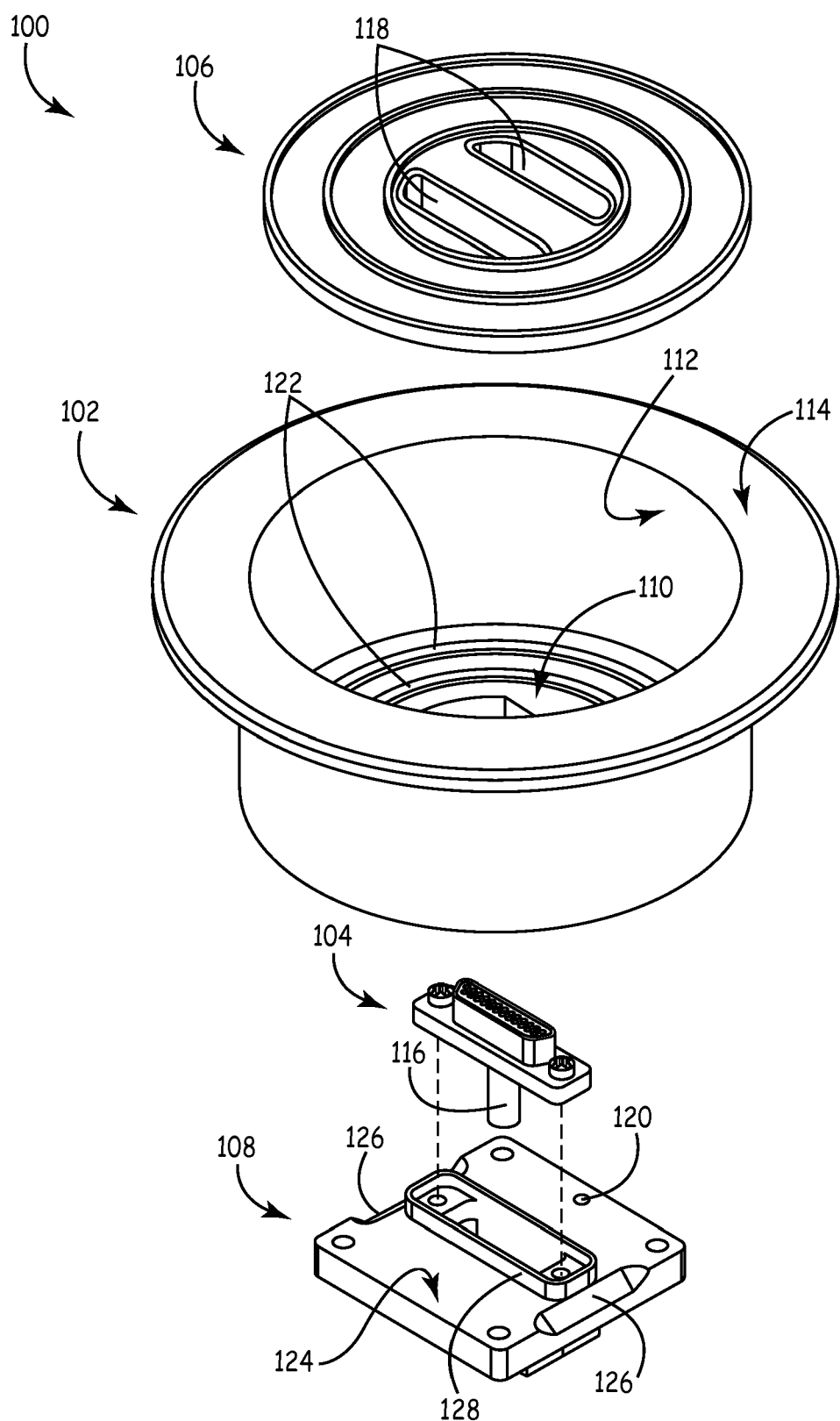
FIG. 1A is an exploded view of one embodiment of an apparatus for controlling liquid in a cup holder.

FIG. 1A is a top exploded view of one embodiment of an apparatus 100 for controlling liquid in a cup holder. Apparatus 100 comprises a cup holder 102 with an electrical connector 104 located therein. Apparatus 100 also includes a removable coaster 106 and a connector harness 108.

Cup holder 102 comprises a bottom 110, a side 112, and a lip 114. Lip 114 provides a means to mount cup holder 102 within a circular aperture of a vehicle. For example, in one embodiment, bottom 110 of cup holder 102 is placed into a circular aperture on a surface within a vehicle and lip 114 contacts the surface to support cup holder 102. Side 112 of cup holder connects lip 114 to bottom 110. Bottom 110 supports cups or other items placed within cup holder 102.

In the embodiment shown in FIG. 1A, cup holder 102 has a generally cylindrical internal shape such that cup holder is primarily designed for generally cylindrical objects. In other embodiments, however, cup holder 102 comprises square, rectangular or other shapes. In one embodiment, cup holder 102 is composed of aluminum and has nickel plating on exposed surfaces. In other embodiments, cup holder 102 is composed of materials other than aluminum, such as plastic. Additionally, although in this embodiment, cup holder 102 is configured to hold a single cup (or other item), in other embodiment, cup holder has multiple locations for cups.

Figure 3A:
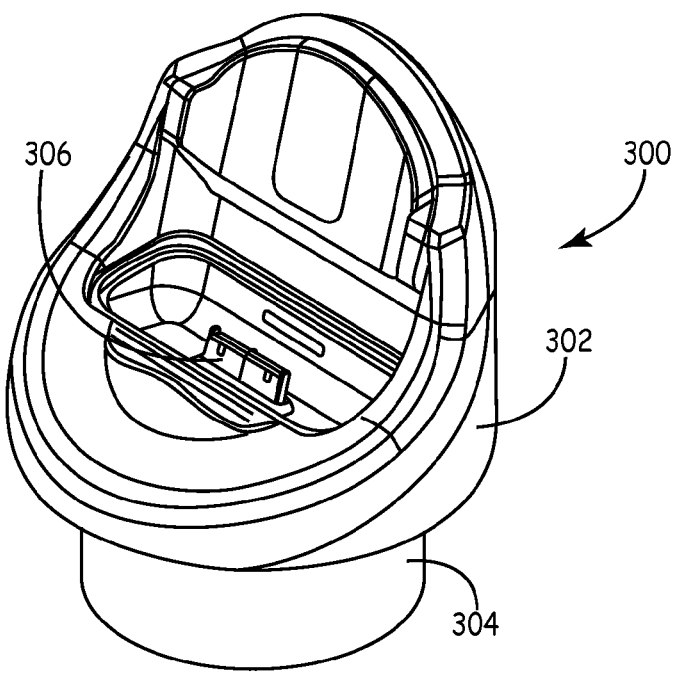
FIG. 3A is a perspective view of one embodiment of a docking station for use with the apparatus of FIG. 1A.
Figure 3B:
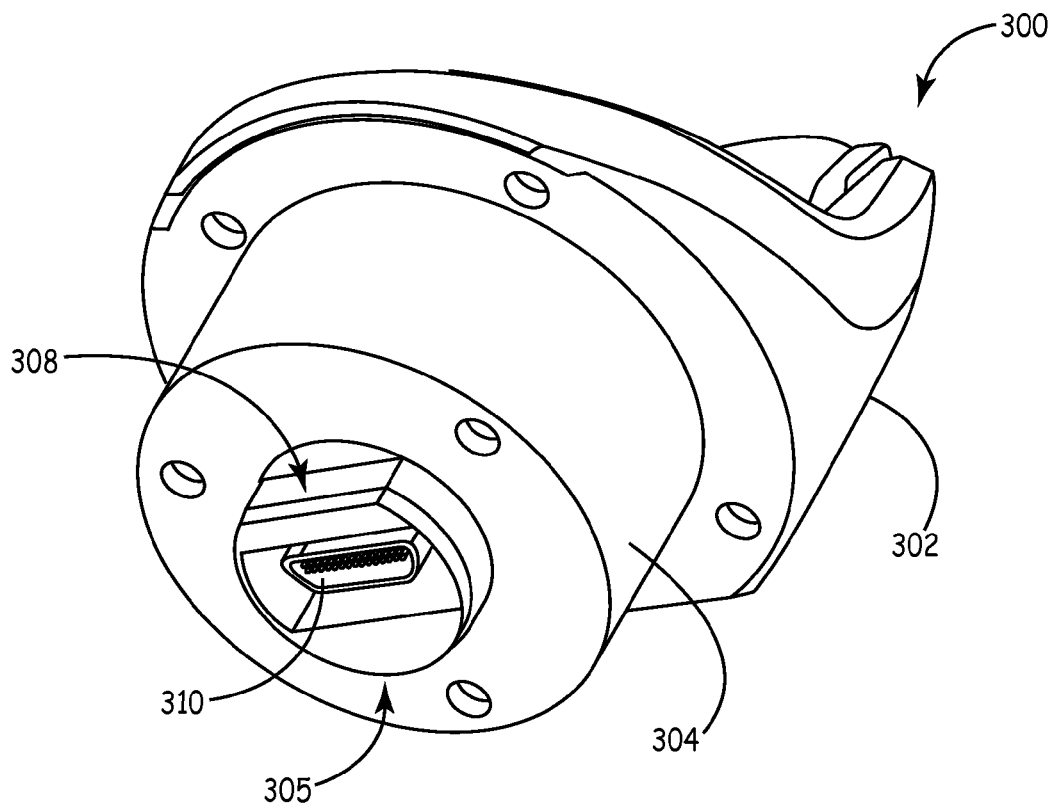
FIG. 3B is another perspective view of the docking station of FIG. 3A.

Electrical connector 104 is configured to mate with another electrical connector on a portable electronic device. For example, as shown in FIGS. 3A and 3B, electrical connector 104 is configured to mate with an electrical connector on a docking station. In the embodiment shown in FIGS. 1A and 1B, electrical connector 104 is mounted in bottom 110 of cup holder 102.

Electrical connector 104 is mounted to cup holder 102 via connector harness 108. Electrical connector 104 mounts to connector harness 108 and connector harness 108 mounts to cup holder 102 to hold connector 104 in place within cup holder 102. In this embodiment, electrical connector 104 and connector harness 108 are configured to disconnect from cup holder 102. This enables manufacturing process to be performed on cup holder 102 without connector 104 and connector harness 108 attached. For example, in some embodiments it is advantageous to perform nickel plating on cup holder 102 without having connector 104 or connector harness 108 attached thereto.

In this embodiment, electrical connector 104 mounts to connector harness 108 via a plurality of screws (not shown), and connector harness 108 mounts to cup holder 102 via a plurality of screws (not shown). In other embodiments, however, other fastening devices, such as glue or bolts, may be used. In an alternative embodiment, connector harness 108, connector 104, and cup holder 102 are formed of a single integral piece of material.

An electrical cable 116 is coupled to connector 104 to transport signals to and from electrical connector 104. In one embodiment, electrical cable 116 is coupled on one end to electrical connector 104 and on the other end to an in-vehicle electronic system.

Figure 2:
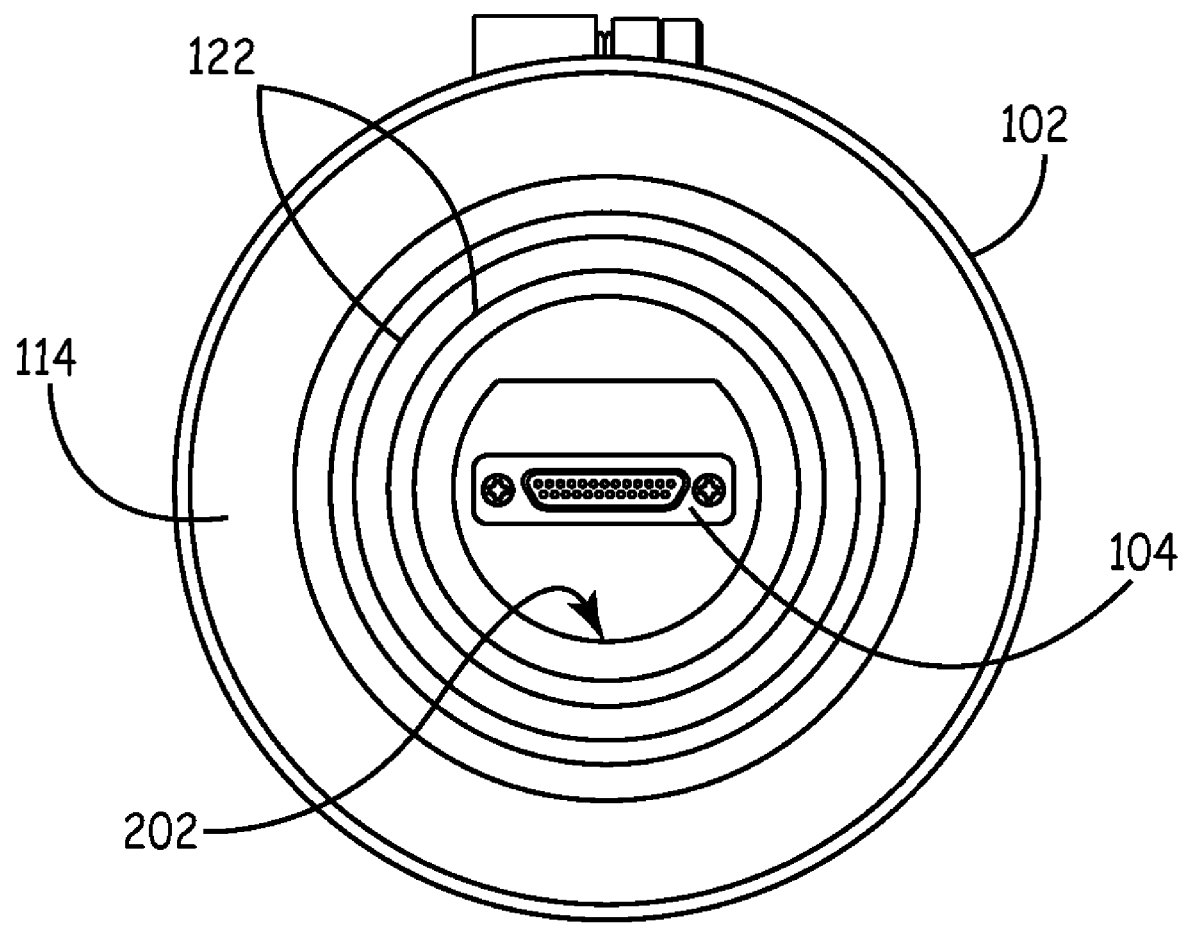
FIG. 2 is a perspective view of the apparatus of FIG. 1A.

As mentioned above, coaster 106 is a removable portion of apparatus 100. When placed in cup holder 102, coaster 106 covers electrical connector 104. To access electrical connector 104 and connect a mating electrical connector thereto, coaster 106 is removed from cup holder 102 as shown in FIG. 2. In one embodiment, coaster 106 is composed of rubber. In other embodiments, coaster 106 is composed of silicon, a rubber-silicon mix, or other flexible materials.

Coaster 106 comprises two grooves 118 to aid in removal of coaster 106 from cup holder 102. To remove coaster 106 a user places one finger in each groove 118 and squeezes the grooves towards each other. Squeezing grooves 118 towards each other enables the user to more easily grip coaster 106 and pull coaster 106 out of cup holder 102. Additionally, grooves 118 enable the user to pull coaster 106 out of cup holder 102 from the center, which aids in releasing any liquid seal between coaster 106 and cup holder 102. In one embodiment, grooves 118 are closed on the bottom such that any liquid entering grooves does not leak out below coaster 106.

Figure 1B:
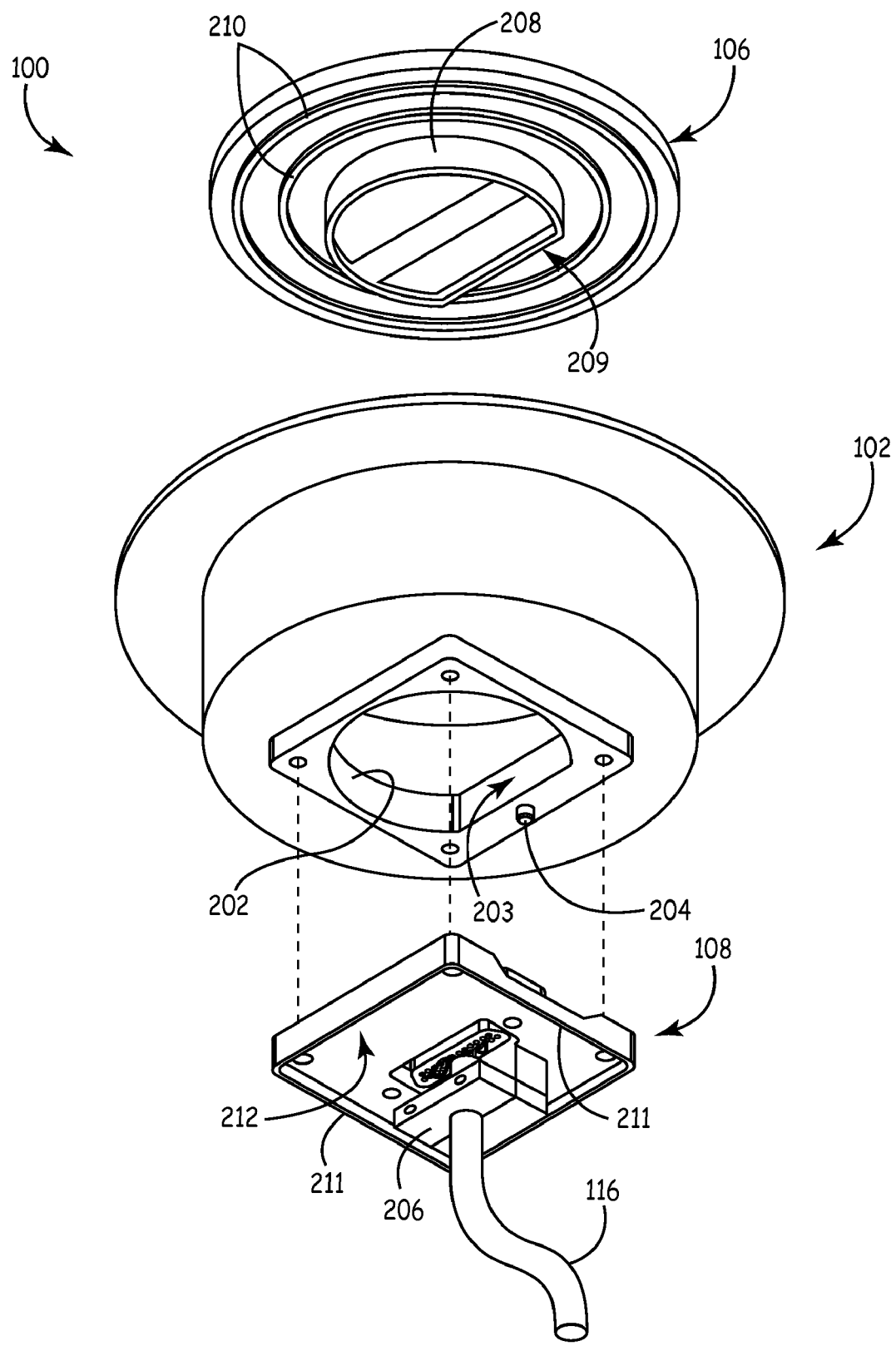
FIG. 1B is another exploded view of the apparatus of FIG. 1A.

Referring now to FIG. 1B, a bottom exploded view of apparatus 100 is shown. Cup holder 102 comprises an aperture 202 to enable access to connector 104 through bottom 110 of cup holder 102. Cup holder 102 also comprises an alignment feature 204 for aligning connector harness 108 (and thus connector 104) within cup holder 102. Alignment feature 204 matches with a corresponding alignment feature 120 (shown in FIG. 1A) on connector harness 108. Alignment features 204 and 120 ensure that connector harness 108 is connected to cup holder 102 in the proper orientation. This in turn ensures that connector 104 is installed within cup holder 102 in the proper orientation. Installing connector 104 in the proper orientation ensures that a docking station or portable electronic device placed into cup holder 102 can properly mate with connector 104.

Aperture 202 in cup holder 102 is a generally circular aperture with a flattened portion 203. The circular aperture 202 and flattened portion 203 match with a corresponding circular feature having a flattened portion on a docking station (shown in FIGS. 3A and 3B) to be installed in cup holder 102. This provides easier alignment of the connector on the docking station with connector 104.

Referring now to FIG. 2, a top perspective view of apparatus 100 is shown with coaster 106 removed. In this embodiment, electrical connector 104 is mounted in aperture 202 in bottom 110 of cup holder 102. Electrical connector 104 is mounted such that there is a gap between electrical connector 104 and the sides of aperture 202. Thus, liquid flowing on bottom 110 and over the sides of aperture 202 does not contact electrical connector 104.

Referring back to FIGS. 1A and 1B, coaster 106 also has a protruding feature 208 that matches with aperture 202. Feature 208, therefore, is generally circular with a flattened portion 209. When coaster 106 is placed in cup holder 102, feature 208 extends into aperture 202. In addition, coaster 106 comprises a plurality of protruding ridges 210 that match with a plurality of grooves 122 of cup holder 102. When coaster 106 is placed in cup holder 102, ridges 210 extend into grooves 122 and form a labyrinth seal between coaster 106 and cup holder 102. The labyrinth seal restricts the flow of liquid between coaster 106 and cup holder 102. Thus, when coaster 106 is placed in cup holder 102, liquid spilled or otherwise present on coaster 102 slowly flows under coaster 102 and into aperture 202 of cup holder 102. For example, in one embodiment, the labyrinth seal allows a flow of liquid equal to a slow drip. Thus, a slow flow of liquid is allowed, such that liquid does not pool indefinitely within cup holder 102. The slow flow of liquid enables the liquid to flow out of cup holder 102 such that the when coaster 106 is removed a large pool of liquid is not left to flow down in cup holder 102 and onto connector 104. In another embodiment, the labyrinth seal completely blocks the flow of liquid, thus all liquid on top of coaster 106 remains on top of coaster 106, and no liquid flows through the labyrinth seal. The weight of items on top of coaster 106 aids in forming the labyrinth seal by providing force on coaster 106 to press ridges 210 into grooves 122.

The height of protruding ridges 210, the corresponding depth of grooves 122, and the number of ridges 210/grooves 122 affect the flow rate of the liquid through the labyrinth seal. For example, additional ridges 210 and corresponding grooves 122 provide greater restriction on the flow of liquid through the labyrinth seal. Thus, a larger number of ridges 210 and corresponding grooves 122 reduce the flow rate of liquid through the labyrinth seal. Additionally, the taller protruding ridges 210 and deeper grooves 122 provide larger restriction on liquid flow, and therefore reduce the flow rate of liquid through the labyrinth seal.

In the embodiment shown in FIGS. 1A and 1B, ridges 210 and grooves 122 form concentric rings. In other embodiments, other shapes are used for ridges 210 and grooves 122. Coaster 106 is slightly smaller in diameter than the inside of cup holder 102, such that liquid present on top of coaster 106 may flow between the side of coaster 106 and side 112 of cup holder 102. Liquid flowing through labyrinth seal slowly flows between coaster 106 and bottom 110 of cup holder 102. After the liquid flows slowly through the labyrinth seal, the liquid flows into aperture 202 of cup holder 102. When coaster 106 is installed in cup holder 102, there is a small gap between the bottom of feature 208 and top surface 124 of connector harness 108. The liquid flowing through labyrinth seal of coaster 106 flows to the bottom of feature 208, from the bottom of feature 208 the liquid drips onto top surface 124 of connector harness 108. Once the liquid is on top surface 108 of connector harness 108, the liquid flows out of weep holes 126 formed between connector harness 108 and cup holder 102.

Weep holes 126 have a large enough volume to support a higher fluid flow rate than allowed by labyrinth seal. Thus, liquid flowing through labyrinth seal will not pool on top surface 124 of connector harness 108, because the liquid can flow out weep holes 126 faster than the liquid can flow onto top surface 124 through labyrinth seal. Connector harness 108 also has a wall 128 surrounding connector 104 to prevent the liquid on top surface 124 from intruding into connector 104. Wall 128 forms a barrier between connector 104 and top surface 124 of connector harness 108.

In the embodiment shown in FIGS. 1A and 1B, connector harness 108 comprises two weep holes 126 on opposite edges of top surface 124. Weep holes 126 are located on opposite edges of top surface 124 in order to better allow liquid on either side of top surface 124 to flow out one of the weep holes 126 without having to flow across to the other side of top surface 124. In this embodiment, weep holes 126 are beveled edges of connector harness 108. The beveled edges form a space between connector harness 108 and cup holder 102. This space allows liquid to flow between cup holder 102 and connector harness 108. In other embodiments, connector harness 108 comprises one or more than two weep holes 126. Furthermore, in other embodiments, weep holes 126 are of different shapes and/or at locations within connector harness 108, for example, in another embodiment, weep holes 126 are circular apertures extending from top surface 124 through connector harness 108.

Liquid flowing through weep holes 126 travels to drip line 211 (shown in FIG. 1B). Drip line 211 is a projected ridge extending from bottom surface 212 of connector harness 108. Drip line 211 is shaped and oriented such that liquid flowing through weep holes 126 accumulates on drip line 211, forms into droplets, and drips from drip line 211 away from connector harness 108. Drip line 211 is positioned such that at least part of drip line 211 is in the path of liquid flowing from weep holes 126. For example, as shown in FIGS. 1A and 1B, portions of drip line 211 are located directly below weep holes 126 such that liquid flowing through weep holes 126 flows down to drip line 211. Additionally, drip line 211 projects outward from bottom surface 212. This causes liquid flowing to drip line 211 to form into drops and fall from drip line 211 due to the surface tension of the liquid. Thus, the liquid does not wrap around connector harness 108 and flow along bottom surface 212 of connector harness 108 to come near the junction of connector 104 and cable 116. As shown in FIGS. 1A and 1B, the portions of drip line 211 below weep holes 126 connect directly to weep holes 126 such that liquid flowing through weep holes 126 sticks onto a surface and flows directly to drip line 211. Drip line 211 projects in a downward direction such that gravity causes the liquid to flow to point of drip line 211 and form a droplet. Drip line 211 is also positioned such that drips falling from drip line 211 do not contact connector 104 or the junction between connector 104 and cable 116. In the embodiment shown in FIGS. 1A and 1B, drip line 211 extends around the entire perimeter of bottom surface 212 of connector harness 108. In other embodiments, however, drip line 211 is located only directly below weep holes 126. In yet other embodiments, drip line 211 is a feature that projects to one or more peaks.

Electrical cable 116 is coupled to electrical connector 104 and is held in place near electrical connector 104 with a clamp 206. Clamp 206 comprises a movable portion that is closed against a stationary portion to hold cable 116 in place. Holding cable 116 in place reduces the strain on the junction between connector 104 and cable 116.

FIGS. 3A and 3B illustrate one embodiment of a docking station 300 for use in cup holder 102. Docking station 300 comprises a body 302, a base 304, and a connector plug 305. Body 302 is used to couple to and support a portable electronic device. Body 302 comprises an electrical connector 306 for mating with an electrical connector on a portable electronic device. Base 304 is generally cylindrical and supports docking station 300 in cup holder 102. Connector plug 305 is also generally cylindrical shape and has a flattened portion 308 that matches with aperture 202 cup holder 102. Connector plug 305, therefore, is shaped to fit into aperture 202 of cup holder 102. Connector plug 305 comprises a second electronic connector 310 for mating with electrical connector 104 of apparatus 100. Flattened portion 308 of base 304 and flattened portion 203 of aperture 202 in cup holder 102 ensure proper orientation of the electronic connector 310 in base 304 with electrical connector 104 in apparatus 100.

To place docking station 300 in apparatus 100, coaster 106 is removed from cup holder 102. To remove coaster 106, a user places their fingers in grooves 118 and squeezes the material of coaster 106 between grooves 118 to grip coaster 106. The user then removes coaster 106 from cup holder 102. Docking station 300 is then placed in apparatus 100 by aligning flattened portion 308 of base 304 with flattened portion 203 of aperture 202. The electronic connector 310 in base 304 of docking station 300 is then mated with electrical connector 104 in apparatus 100.

When docking station 300 is placed in apparatus 100 and a portable electronic device is mounted in docking station 300, the portable electronic device is coupled through docking station, electrical connector 104 and cable 116 to an in-vehicle system.

To use apparatus 100 to hold items other than docking station 300, such as a cup, docking station 300 is removed and coaster 106 is placed within cup holder 102. Coaster 106 is placed into cup holder 102 such that feature 208 and flattened portion 209 align with aperture 202 and flattened portion 203, thus allowing protrusions 210 on coaster 106 to engage into grooves 122 in bottom 110 of cup holder 102. Connector 104 is then protected from intrusion by liquid spilled into apparatus 100 or from condensation off of the item in apparatus 100. Although in this embodiment, docking station 300 is shown as coupling with electrical connector 104, in other embodiments, other portable electronic devices are configured to couple with electrical connector 104.

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the inventions herein. Therefore, it is manifestly intended that the inventions herein be limited only by the claims and the equivalents thereof.

What is claimed is:

1. An apparatus for controlling liquid in a cup holder, the apparatus comprising:
   a cup holder having a bottom, the bottom having at least one aperture and a plurality of grooves;
   an electrical connector located within the at least one aperture;
   a removable coaster configured to be placed within the cup holder and cover the electrical connector, the removable coaster having a plurality of ridges extending therefrom and configured to extend into the plurality of grooves in the bottom of the cup holder;
   a surface positioned below the aperture, the surface having at least one weep hole and at least one wall between the surface and the electrical connector; and
   a drip line in a path of liquid flow from the at least one weep hole.

2. The apparatus of claim 1, wherein the surface is located on a connector harness, the connector harness mounted to the cup holder and having the electrical connector mounted thereto.

3. The apparatus of claim 1, wherein the plurality of grooves and the plurality of ridges form a labyrinth seal between the removable coaster and the cup holder.

4. The apparatus of claim 1, wherein the plurality of grooves is two grooves and the plurality of ridges is two ridges.

5. The apparatus of claim 1, wherein when the removable coaster is in the cup holder, a slow drip of liquid is allowed through the aperture in the cup holder.

6. The apparatus of claim 1, wherein the plurality of ridges form concentric rings on the removable coaster and the plurality of grooves form concentric rings on the bottom of cup holder.

7. The apparatus of claim 1, wherein the at least one weep hole comprises a beveled edge of the surface.

8. The apparatus of claim 1, wherein at least one weep hole comprises a first weep hole on a first edge of the surface and a second weep hole on a second edge of the surface, wherein the first and the second weep holes are on opposite edges of the surface.

9. The apparatus of claim 1, wherein the coaster comprises a plurality of grooves on a top surface, the plurality of grooves configured to aid in removal of coaster from the cup holder.

10. The apparatus of claim 9, wherein the plurality of grooves are closed such that liquid does not leak out.

11. The apparatus of claim 1, further comprising:
a removable docking station comprising:
a first electrical connector for a portable electronic device;
a second electrical connector configured to mate with the electrical connector located within the at least one aperture;
a connector plug configured to match with the at least one aperture.

12. A cup holder comprising:
a bottom surface having at least one aperture and a plurality of grooves;
a removable coaster having a plurality of ridges configured to extend into the plurality of grooves;
a connector harness mounted to the cup holder, the connector harness comprising:
a surface positioned below the at least one aperture, the surface having an electrical connector mounted thereon;
a wall surrounding the electrical connector; and
at least one weep hole; and
a drip line located below the at least one weep hole; and
a removable docking station comprising:
a first electrical connector for a portable electronic device;
a second electrical connector configured to mate with the electrical connector mounted on the surface of the connector harness; and
a connector plug configured to match with the at least one aperture.

13. The cup holder of claim 12, wherein the plurality of grooves and the plurality of ridges form a labyrinth seal between the coaster and the cup holder.

14. The cup holder of claim 12, wherein when the removable coaster is in the cup holder a slow drip of liquid is allowed through the aperture in the cup holder.

15. The cup holder of claim 12, wherein the plurality of ridges form concentric rings on the removable coaster and the plurality of grooves form concentric rings on the bottom of cup holder.

16. The cup holder of claim 12, wherein the at least one weep hole comprises a beveled edge of the surface.

17. An apparatus for controlling liquid in a cup holder, the apparatus comprising:
a cup holder having at least one aperture in a bottom and a plurality of grooves on the bottom;
a first electrical connector mounted in the bottom of the cup holder;
a removable coaster configured to be placed within the cup holder, the removable coaster comprising a plurality of ridges, the plurality of ridges configured to match with the plurality of grooves in the cup holder;
a portable electronic device having a second electrical connector configured to match with the first electrical connector; and
a connector harness mounted to the cup holder, wherein the first electrical connector is mounted to the connector harness, the connector harness configured to collect liquid flowing through the at least one aperture, the connector harness having at least one weep hole for directing liquid off of the connector harness, and the connector harness having a wall surrounding the first electrical connector to protect the first electrical connector from intrusion of liquid on the connector harness.

18. The apparatus of claim 17, wherein the at least one weep hole is a space between the connector harness and the cup holder.

\* \* \* \* \*